(12) United States Patent     (10) Patent No.:   US 12,656,857 B2

Fields et al.     (45) Date of Patent:    Jun. 16, 2026

(54) SYSTEMS AND METHODS FOR AUGMENTED REALITY- ASSISTED HOME INSPECTION

(71) Applicant: STATE FARM MUTUAL AUTOMOBILE INSURANCE COMPANY, Bloomington, IL (US)

(72) Inventors: Brian M. Fields, Phoenix, AZ (US); Nathan L. Tofte, Downs, IL (US); Aaron C. Williams, Bloomington, IL (US); Joseph P. Harr, Bloomington, IL (US); Vicki King, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 629 days.

(21) Appl. No.: 17/962,194

(22) Filed: Oct. 7, 2022

(65) Prior Publication Data

US 2024/0053816 A1     Feb. 15, 2024

Related U.S. Application Data

(60) Provisional application No. 63/397,691, filed on Aug. 12, 2022.

(51) Int. Cl.
    *G06F 3/01*       (2006.01)
    *G06N 20/00*     (2019.01)
    (Continued)

(52) U.S. Cl.
    CPC ............. *G06F 3/011* (2013.01); *G06N 20/00* (2019.01); *G06Q 50/163* (2013.01);
    (Continued)

(58) Field of Classification Search
    CPC ...... G06F 3/011; G06N 20/00; G06Q 50/163; G06T 7/0004; G06T 15/205;
    (Continued)

(56) References Cited

U.S. PATENT DOCUMENTS

| 9,057,746 B1 | 6/2015 | Houlette et al. |
| 9,152,737 B1 | 10/2015 | Micali et al. |
| | (Continued) | |

FOREIGN PATENT DOCUMENTS

| CN | 111626536 A | 9/2020 |
| CN | 113138558 A | 7/2021 |
| | (Continued) | |

OTHER PUBLICATIONS

Barnum, Peter, et al. "Dynamic seethroughs: Synthesizing hidden views of moving objects." 2009 8th IEEE International Symposium on Mixed and Augmented Reality. IEEE, 2009. (Year: 2009).*

*Primary Examiner* — Gregory A Morse
*Assistant Examiner* — Renae A Bitor
(74) *Attorney, Agent, or Firm* — MARSHALL, GERSTEIN & BORUN LLP; William J. Samore

(57) ABSTRACT

The following relates generally to using augmented reality (AR) for inspection of a property. In some examples, underlay layer data may be received (e.g., from a camera of an AR viewer device); and overlay layer data may be received (e.g., from a different camera or other overlay layer device). An AR display may be created by correlating the underlay layer data with the overlay layer data. A property inspection indicia may be identified based upon the correlated overlay layer data.

26 Claims, 8 Drawing Sheets

(51) Int. Cl.

| | |
|---|---|
| *G06Q 50/163* | (2024.01) |
| *G06T 7/00* | (2017.01) |
| *G06T 15/20* | (2011.01) |
| *G06T 19/00* | (2011.01) |

(52) U.S. Cl.

CPC .......... *G06T 7/0004* (2013.01); *G06T 15/205* (2013.01); *G06T 19/006* (2013.01); *G06T 2207/20081* (2013.01)

(58) Field of Classification Search

CPC ......... G06T 19/006; G06T 2207/20081; G06T 2210/04; G06T 2219/004

See application file for complete search history.

(56) References Cited

U.S. PATENT DOCUMENTS

| | | | |
|---|---|---|---|
| 9,443,195 | B2 | 9/2016 | Micali et al. |
| 9,609,003 | B1 | 3/2017 | Chmielewski et al. |
| 9,699,529 | B1 | 7/2017 | Petri et al. |
| 9,739,813 | B2 | 8/2017 | Houlette et al. |
| 9,798,979 | B2 | 10/2017 | Fadell et al. |
| 9,800,958 | B1 | 10/2017 | Petri et al. |
| 9,942,630 | B1 | 4/2018 | Petri et al. |
| 10,102,584 | B1 | 10/2018 | Devereaux et al. |
| 10,142,394 | B2 | 11/2018 | Chmielewski et al. |
| 10,198,771 | B1 | 2/2019 | Madigan et al. |
| 10,296,978 | B1 | 5/2019 | Corder et al. |
| 10,332,059 | B2 | 6/2019 | Matsuoka et al. |
| 10,469,282 | B1 | 11/2019 | Konrardy et al. |
| 10,586,177 | B1 | 3/2020 | Choueiter et al. |
| 10,664,922 | B1 | 5/2020 | Madigan et al. |
| 10,699,346 | B1 | 6/2020 | Corder et al. |
| 10,699,348 | B1 | 6/2020 | Devereaux et al. |
| 10,735,829 | B2 | 8/2020 | Petri et al. |
| 10,740,691 | B2 | 8/2020 | Choueiter et al. |
| 10,750,252 | B2 | 8/2020 | Petri et al. |
| 10,796,557 | B2 | 10/2020 | Sundermeyer et al. |
| 10,802,477 | B1 | 10/2020 | Konrardy et al. |
| 10,804,700 | B2 | 10/2020 | Cohen et al. |
| 10,818,105 | B1 | 10/2020 | Konrardy et al. |
| 10,824,867 | B1 * | 11/2020 | Assam ................... H04W 4/021 |
| 10,907,844 | B2 | 2/2021 | Ribbich et al. |
| 11,003,334 | B1 | 5/2021 | Conway et al. |
| 11,100,594 | B1 | 8/2021 | West et al. |
| 11,164,257 | B1 | 11/2021 | Devereaux et al. |
| 11,188,686 | B2 * | 11/2021 | Duff ........................ G06F 30/13 |
| 11,232,873 | B1 | 1/2022 | Aspro et al. |
| 11,277,465 | B2 | 3/2022 | Chmielewski et al. |
| 11,348,193 | B1 | 5/2022 | Konrardy et al. |
| 11,417,212 | B1 | 8/2022 | Farooqui et al. |
| 11,610,238 | B1 * | 3/2023 | Kwak ................... G06V 20/20 |
| 2009/0265193 | A1 | 10/2009 | Collins et al. |
| 2014/0266669 | A1 | 9/2014 | Fadell et al. |
| 2015/0061859 | A1 | 3/2015 | Matsuoka et al. |
| 2015/0347910 | A1 | 12/2015 | Fadell et al. |
| 2017/0076408 | A1 * | 3/2017 | D'Souza ................ G06Q 20/10 |
| 2019/0236732 | A1 * | 8/2019 | Speasl ................... G05D 1/101 |
| 2019/0251520 | A1 | 8/2019 | Bentley, III et al. |
| 2020/0104522 | A1 * | 4/2020 | Collart ................... G06T 19/20 |
| 2021/0279811 | A1 | 9/2021 | Waltman et al. |
| 2021/0312789 | A1 | 10/2021 | Linn |
| 2022/0101275 | A1 | 3/2022 | Aspro et al. |

FOREIGN PATENT DOCUMENTS

| | | |
|---|---|---|
| JP | 2003157357 A | 5/2003 |
| KR | 20150129845 A | 11/2015 |
| WO | WO-2014159131 A2 | 10/2014 |
| WO | WO-2016081511 A2 | 5/2016 |
| WO | WO-2021087185 A1 | 5/2021 |

* cited by examiner

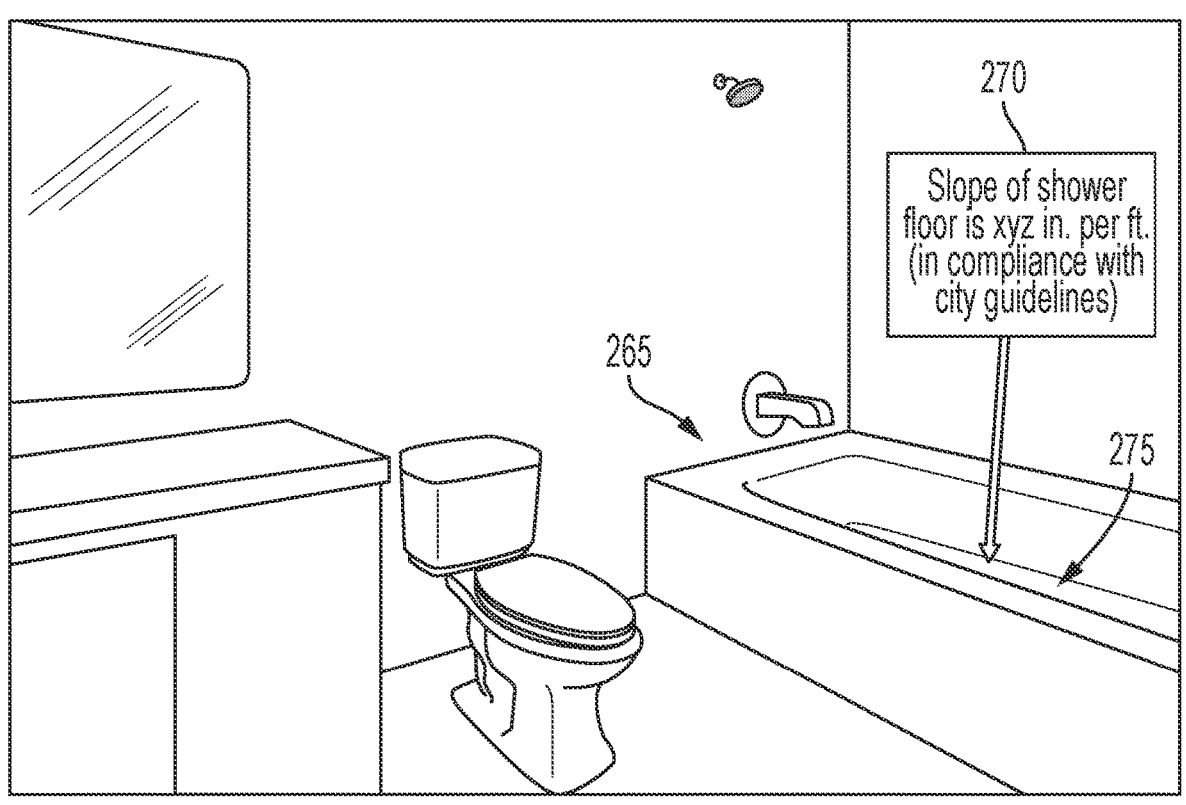
FIG. 2C

400

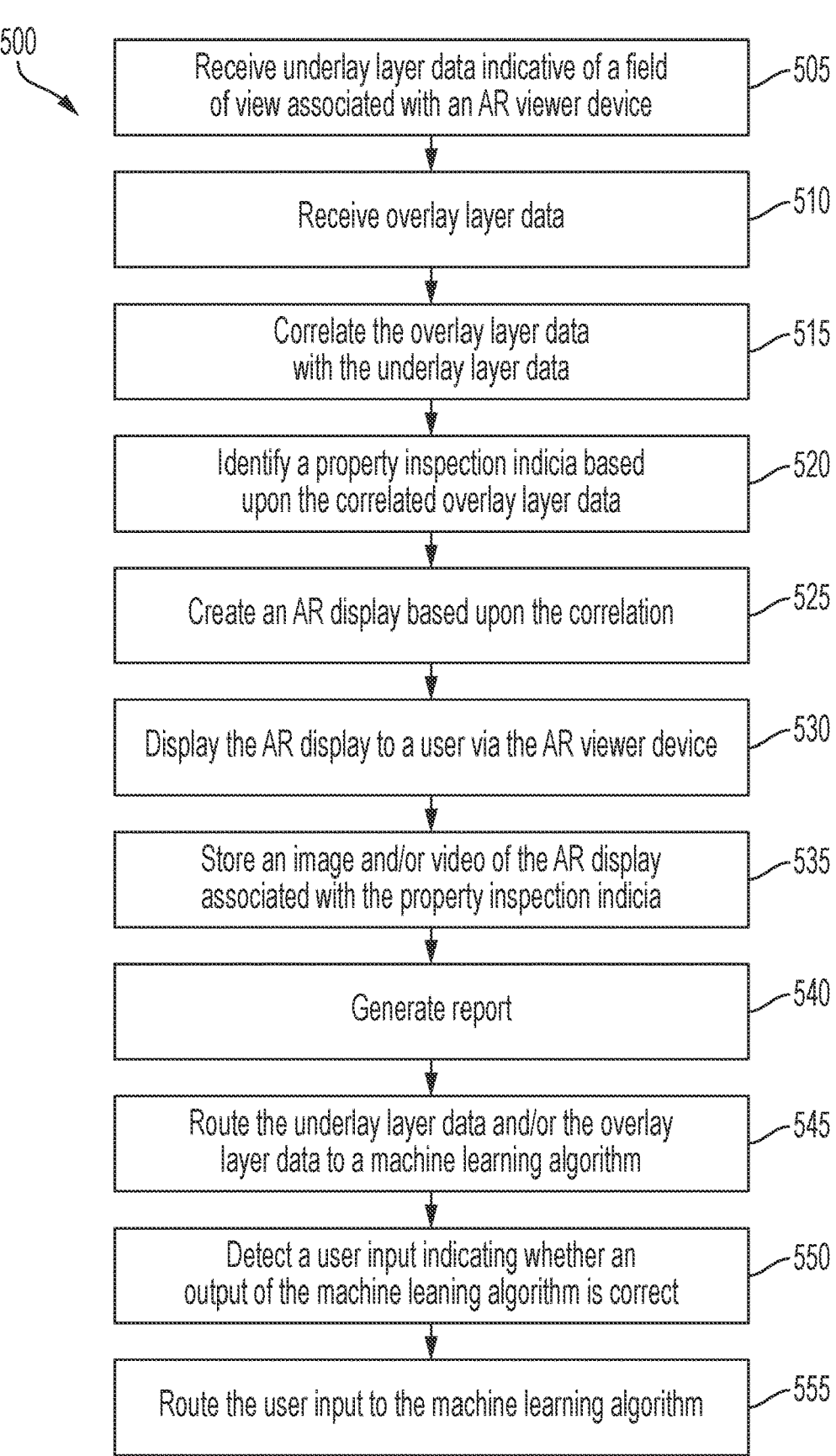

500

Receive underlay layer data indicative of a field of view associated with an AR viewer device —505

Receive overlay layer data —510

Correlate the overlay layer data with the underlay layer data —515

Identify a property inspection indicia based upon the correlated overlay layer data —520

Create an AR display based upon the correlation —525

Display the AR display to a user via the AR viewer device —530

Store an image and/or video of the AR display associated with the property inspection indicia —535

Generate report —540

Route the underlay layer data and/or the overlay layer data to a machine learning algorithm —545

Detect a user input indicating whether an output of the machine leaning algorithm is correct —550

Route the user input to the machine learning algorithm —555

FIG. 5

SYSTEMS AND METHODS FOR AUGMENTED REALITY- ASSISTED HOME INSPECTION

CROSS REFERENCE TO RELATED APPLICATIONS

This application claims the benefit of U.S. Provisional Application No. 63/397,691, entitled "Systems and Methods for Augmented Reality-Assisted Home Inspection" (filed Aug. 12, 2022), the entirety of which is incorporated by reference herein.

FIELD

The present disclosure generally relates to Augmented Reality (AR), and more particularly relates to using AR for inspection of a property.

BACKGROUND

Conventional techniques for property inspection (e.g., building inspection) may involve a human inspector visiting a property, and manually searching the property for problems, code violations, etc. However, this may be cumbersome because some places in the property may be difficult, or even impossible, to reach. Furthermore, current techniques may be inefficient because of the large amount of time it takes for the inspector to walk through the property while recording each problem she finds. The inefficiency may be compounded even further by the large amount of time it takes to write an inspection report based upon the conventional property inspection. Conventional techniques may have additional drawbacks as well.

SUMMARY

In one aspect, a computer-implemented method of using Augmented Reality (AR) for inspection of a property may be provided. The method may be implemented via one or more local or remote processors, servers, transceivers, sensors, virtual reality or AR headsets or glasses, mobile devices, wearables, and/or other electronic or electric components. In one instance, the method may include: (1) receiving, with one or more processors, underlay layer data indicative of a field of view associated with an AR viewer device; (2) receiving, with the one or more processors, overlay layer data; (3) correlating, with the one or more processors, the overlay layer data with the underlay layer data; (4) identifying, with the one or more processors, a property inspection indicia based upon the correlated overlay layer data; (5) creating, with the one or more processors, an AR display based upon the correlation, the AR display including an indication of the property inspection indicia; and/or (6) displaying, with the one or more processors, the AR display to a user via the AR viewer device. The method may include additional, fewer, or alternate actions, including those discussed elsewhere herein.

In another aspect, a computer system configured to use Augmented Reality (AR) for inspection of a property may be provided. The computer system may comprise one or more processors configured to: (1) receive underlay layer data indicative of a field of view associated with an AR viewer device; (2) receive overlay layer data; (3) correlate the overlay layer data with the underlay layer data; (4) identify, with the one or more processors, a property inspection indicia based upon the correlated overlay layer data; (5)

create an AR display based upon the correlation, the AR display including an indication of the property inspection indicia; and/or (6) display the AR display to a user via the AR viewer device. The computer system may include additional, less, or alternate functionality, including that discussed elsewhere herein.

In yet another aspect, a computer device for using Augmented Reality (AR) for inspection of a property. The computer device may include: one or more processors; and one or more memories coupled to the one or more processors. The one or more memories including computer executable instructions stored therein that, when executed by the one or more processors, may cause the one or more processors to: (1) receive underlay layer data indicative of a field of view associated with an AR viewer device; (2) receive overlay layer data; (3) correlate the overlay layer data with the underlay layer data; (4) identify, with the one or more processors, a property inspection indicia based upon the correlated overlay layer data; (5) create an AR display based upon the correlation, the AR display including an indication of the property inspection indicia; and/or (6) display the AR display to a user via the AR viewer device. The computer device may include additional, less, or alternate functionality, including that discussed elsewhere herein.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

FIG. 2C illustrates an exemplary AR display, including an indication that a property feature is in compliance with a city guideline.

FIG. 5 illustrates an exemplary flowchart for using AR for inspection of a property, in accordance with various embodiments.

DETAILED DESCRIPTION

Figure 1:
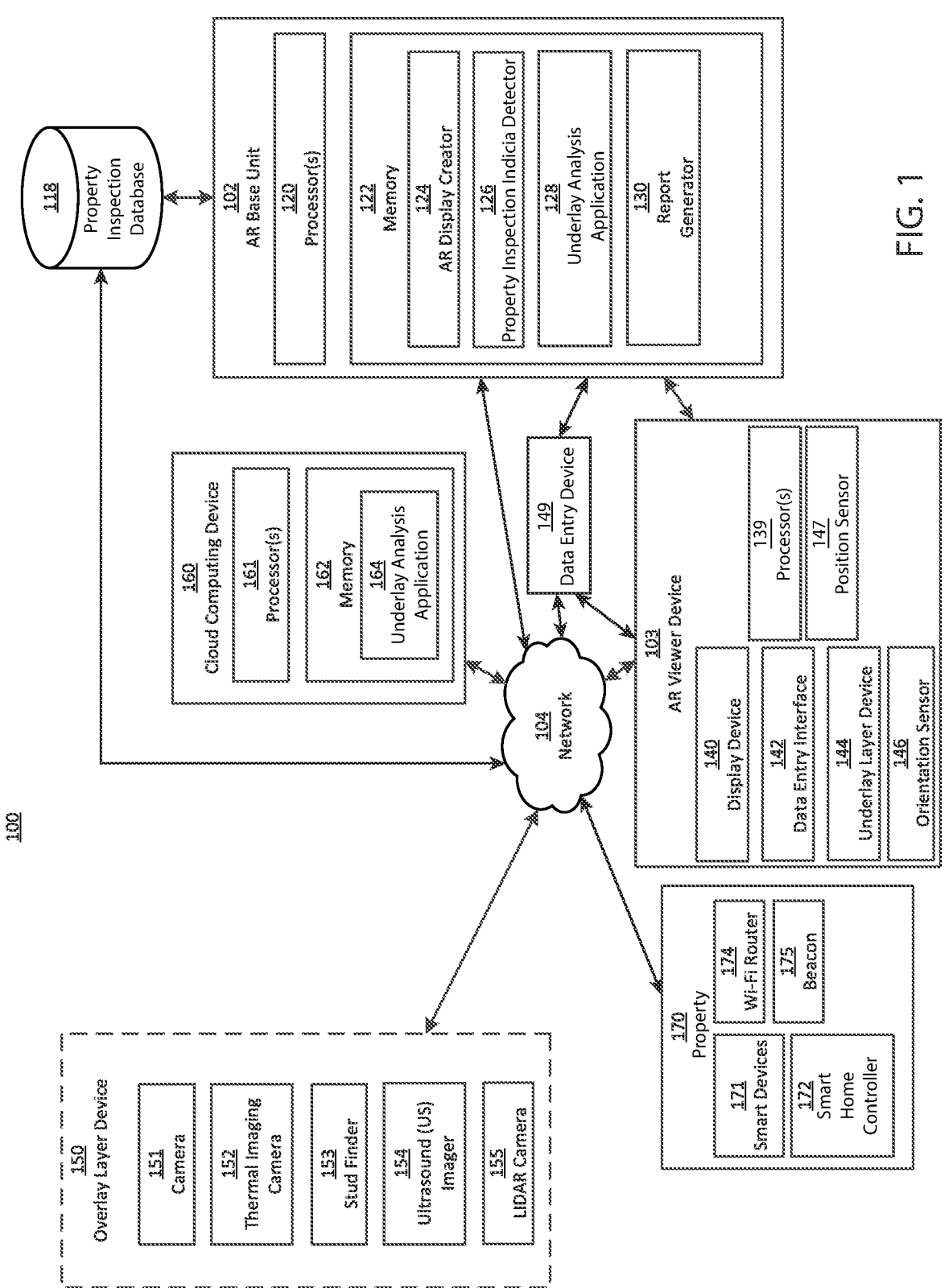
FIG. 1 shows an exemplary AR property inspection system.

The systems and methods disclosed herein generally relate to, inter alia, using Augmented Reality (AR) for property inspection. As used herein, the term AR should be understood to refer to the generation of a display that overlays digitally-generated information on a view of one's natural surroundings. This may include presenting a heads up display (HUD), alerts, and/or other indications of the digitally-generated information on a transparent surface of an AR viewer device such that a wearer of the AR viewer device is still able to view their natural surroundings. As will be described below, in some embodiments an AR viewer device may be a virtual reality (VR) viewer device that does not include a transparent surface. In these embodiments, the VR viewer device may be paired with a digital camera that records the wearer's natural surroundings and presents the recorded image data via the VR display. Accordingly, as it is generally used here, the term AR also encompasses the display of digitally-generated information on a view of one's natural surroundings via a VR display.

Conventional techniques for property inspection may involve a human inspector visiting a property, and manually searching the property for problems, code violations, etc. However, this may be cumbersome because some places in the property may be difficult, or even impossible, to reach. Furthermore, current techniques may be inefficient because of the large amount of time it takes for the inspector to walk through the property while recording each problem. The inefficiency may be compounded even further by the large amount of time it takes to write an inspection report based upon the conventional property inspection. The techniques disclosed herein solve these problems and others.

For example, some embodiments use AR to assist a human inspector in inspecting a property. For instance, an inspector may utilize an AR viewer device during an inspection. The AR viewer device may create an AR display for the inspector based upon received underlay layer data and overlay layer data. As will be described further below, the created AR display may display information and/or viewpoints to the inspector that it would be difficult or impossible for the inspector to otherwise obtain.

The inspector may also provide inputs to the AR viewer device indicating property inspection problems, building code violations, etc. For example, the AR viewer device may show an AR display including a leaking pipe behind a wall. Upon viewing the leaking pipe, the inspector may provide an input to the AR viewer device indicating that there is a property inspection indicia. The input may specify what the property indicia is (e.g., the leaking pipe). Alternatively, the input may indicate simply that there a property inspection indicia has been found.

Additionally or alternately, the AR viewer device itself and/or a paired AR base unit may detect and/or determine the property inspection problems, building code violations, etc. For example, a machine learning algorithm, program, or model may analyze the underlay layer data and/or the overlay layer data to determine the property inspection indicia.

The AR viewer device and/or a paired AR base unit may also create an inspection report and/or assist the inspector in creating an inspection report. The inspection report may include, for example, information of the property, information of any property inspection indicia found, images and/or videos of the property and/or of the property inspection indicia, etc.

Exemplary Augmented Reality (AR) Property Inspection System

FIG. 1 illustrates a block diagram of an exemplary AR property inspection system 100 in which the exemplary computer-implemented methods described herein may be implemented. The high-level architecture includes both hardware and software applications, as well as various data communications channels for communicating data between the various hardware and software components. The system may include an AR viewer device 103. Examples of the AR viewer device 103 may include AR goggles, AR glasses, AR contact lenses, a VR viewer device, a phone, a tablet, a computer, a smart television (TV), a holographic device, etc.

The AR viewer device 103 may include one or more processors 139, such as one or more microprocessors, controllers, and/or any other suitable type of processor. The AR viewer device 139 may further include a display device 140. In one example, where the AR viewer device 103 is a pair of AR goggles or AR glasses, the display device 140 may be a lens of the AR goggles or AR glasses. In another example, where the AR viewer device 103 is a phone, the display device 140 may be a screen of the phone. In yet another example, where the AR device 103 is a holographic device, the display device 140 may be a three-dimensional (3D) projector. But these examples are not limiting. The display device 140 may be any device configured to display an AR display.

The AR viewer device 103 may further include a data entry interface 142 to allow a user (e.g., a property inspector, etc.) to provide information to the AR viewer device 103. In one example, where the AR viewer device 103 is a phone, the data entry interface 142 may be a touch screen of the phone. Additionally or alternatively, the data entry interface 142 may be a touch screen of a lens of the AR viewer device 103. In yet another example, where the AR viewer device 103 is a holographic device, the data entry interface 142 may be a touch screen of a phone or computer communicatively coupled to a three-dimensional (3D) projector. But these examples are not limiting. The data entry interface 142 may be any device configured to allow a user to provide data (e.g., to the AR viewer device 103 and/or the AR base unit 102).

In another example, where the AR viewer device 103 is to be worn by the user, the data entry interface 142 may be a communication interface coupled to a data entry device 149 (e.g., a wand, a glove, a controller, any suitable device allowing a user to input data). Alternatively, the data entry device 149 may be communicatively coupled to the AR base unit 102. In this example, the data entry interface 142 may be a communication interface coupled to an AR base unit 102 that is coupled to the data entry device 149.

The AR viewer device 103 may further include underlay layer device 144 configured to generate underlay layer data. As will be described elsewhere herein, the underlay layer data may be analyzed to create the AR display. In one illustrative example, the underlay layer data device 144 is a camera coupled to the AR viewer device 103 in a manner such that the camera has a field of view that generally aligns with the field of view of a user of the AR viewer device 103. As used herein, the word "camera" should be understood to include a camera that records one or both of images and/or video data. In embodiments where the AR viewer device 103 is a phone or a tablet, the underlay layer data device 144 may be built into the AR viewer device 103. In embodiments where the AR viewer device 103 is worn by the user, the underlay layer data device 144 may be fixedly attached to the AR viewer device 103.

The AR viewer device 103 may further include an orientation sensor 146 (e.g., a gyroscope) to determine an orientation of the AR viewer device 103 (and, thus, the underlay layer data device 144). Further included in the AR viewer device 103 may be position sensor 147, which may be any device capable of determining a position of the AR viewer device 103. In one example, the position sensor 147 may be a GPS sensor. In another example, the position sensor 147 may be a sensor that determines the position based upon data received from external device(s) such Wi-Fi routers and/or beacons, as will be further described below. Moreover, in some embodiments, correlating the position (e.g., from the position sensor 147) and orientation (e.g., from the orientation sensor 146) enables the ability to determine more precise information on what is in the user's field of view to identify the appropriate overlay data for presentation via the AR viewer device 103. For example, correlating the position and orientation may allow correlating the overlay data with objects identified within the underlay layer data.

Figure 6:
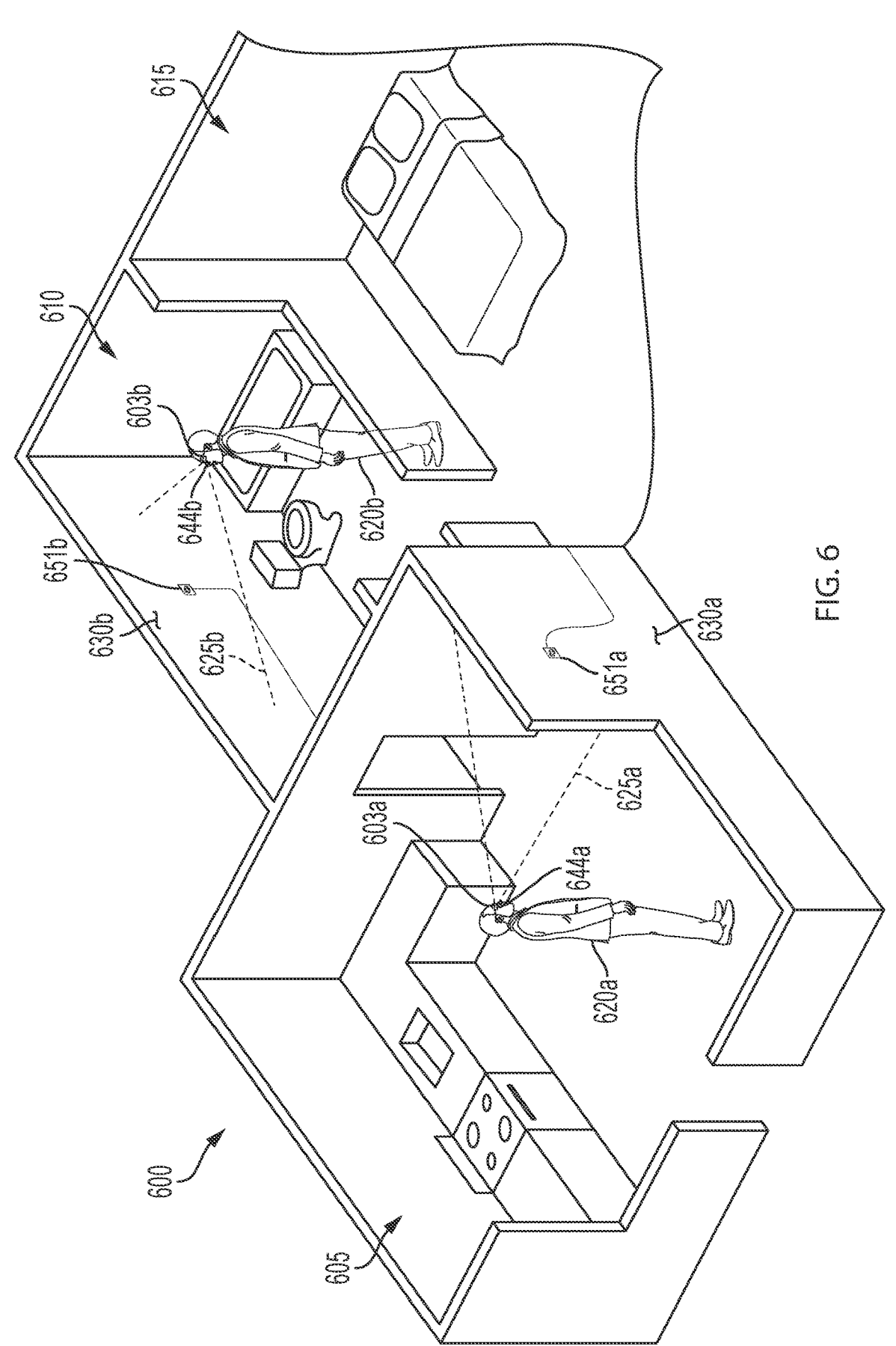
FIG. 6 illustrates an exemplary floorplan including a location of a user.

One example of the correlation of the overlay layer data and the underlay layer data is illustrated by FIG. 6. More specifically, FIG. 6 shows example property 600, including kitchen 605, bathroom 610, and bedroom 615. Accordingly, the underlay layer data may include a floorplan that represents the property 600 and the dimensions and/or locations of the rooms 605-615. In a first illustrated example, a user 620a wearing an AR viewer device 603a including an underlay layer device 644a is in the kitchen 605.

Accordingly, the AR viewer device 603a has a field of view (FOV) 625a. Within the FOV 625a is the wall 630a of the kitchen 605, behind which a camera 651a is snaking. In this example, the underlay layer data (e.g., the position data of the AR viewer device 603a is located in the kitchen 605 and the orientation data of the AR viewer device 603a that indicates that the FOV 625a is oriented at the wall 630a) is analyzed to determine that the camera 651a is within the FOV 625a and obtains the corresponding overlay data associated therewith (e.g., image data generated by the camera 651a).

In a second illustrated example, a user 620b wearing an AR viewer device 603b including an underlay layer device 644b is in the bathroom 610 Accordingly, the AR viewer device 603b has a FOV 625b. Within the FOV 625b is the wall 630b of the bathroom 610. The camera 651b is snaking behind the wall 630b of the bathroom 610. In this example, the location data and/or orientation data of the AR viewer device 603a allows correlation of the underlay layer data from the underlay layer device 644a with the overlay layer data from the camera 651a. Similarly, the location data and/or orientation data of the AR viewer device 603b allows correlation of the underlay layer data from the underlay layer device 644b with the overlay layer data from the camera 651b.

Additionally or alternatively to capturing overlay layer data (e.g., from the cameras 651a, and/or 651b) in real time, pre-generated overlay layer data (e.g., data stored in an external database, such as property inspection database 118, etc.) may be used to create the AR display. For example, an object may be detected in both the overlay layer data and the underlay layer data, and used to correlate the overlay layer data with the underlay layer data. In one example, the object may be any of the walls 630a, 630b. In some embodiments, the position and orientation of the underlay layer device (e.g., determined by the position sensor 147 and the orientation sensor 146) may be used to help correlate the overlay layer data with the underlay layer data.

The example system 100 of FIG. 1 further includes AR base unit 102 coupled to the AR viewer device 103. The AR base unit 102 may perform many of the functions discussed herein, such as creating the AR display. Although the example system 100 of FIG. 1 illustrates the AR base unit 102 separately from the AR viewer device 103, in some embodiments, the AR base unit 102 may be part of the AR viewer device 103. In one example where the AR base unit 102 and the AR viewer device 103 are physically separate, the AR viewer device 103 may be a pair of AR glasses, and the AR base unit 102 is in communication (e.g., via Bluetooth, Wi-Fi, etc.) with the AR viewer device 103, but not physically attached to the AR viewer device 103. In an example where the AR base unit 102 is part of the AR viewer device 103, AR glasses (e.g., the AR viewer device 103) are integrally formed with a case including the AR base unit 102.

The AR base unit 102 may include one or more processors 120 such as one or more microprocessors, controllers, and/or any other suitable type of processor. The AR base unit 102 may further include a memory 122 (e.g., volatile memory, non-volatile memory) accessible by the one or more processors 120, (e.g., via a memory controller). The one or more processors 120 may interact with the memory 122 to obtain and execute, for example, computer-readable instructions stored in the memory 122. Additionally or alternatively, computer-readable instructions may be stored on one or more removable media (e.g., a compact disc, a digital versatile disc, removable flash memory, etc.) that may be coupled to the AR base unit 102 to provide access to the computer-readable instructions stored thereon. In particular, the computer-readable instructions stored on the memory 122 may include instructions for executing various applications, such as an AR display creator 124, a property inspection indicia detector 126, an underlay analysis application 128, and/or a report generator 130.

In some embodiments, the AR base unit 102 dedicates processing resources (e.g., of the one or more processors 120 and/or the memory 122) to generating an AR display for presentation by the AR viewer device 103. Advantageously, this may ensure a more smooth viewing experience, thereby reducing or eliminating the possibility of a user experiencing motion sickness. Additionally, in many embodiments, the AR base unit 102 may have more processing resources than the AR viewer device 103 (e.g., the AR base unit 102 is a phone, and the AR viewer device 103 is a pair of AR goggles with a processor that is less powerful than the phone processor). Accordingly, the analysis of the underlay layer data and the correlation of the underlay layer data to the overlay layer data may typically be performed by the AR base unit 102. However, there may be some embodiments where the AR viewer device 102 has sufficient processing power to perform the disclosed analyses. As such, any description of the processing of underlay layer data and/or the correlation thereof to overlay layer data as being performed by the AR base unit 102 envisions the alternate implementation of the analysis at the AR viewer device 103 and/or distributed between the AR base unit 102 and the AR viewer device 103.

The AR base unit 102 may receive overlay layer data generated by overlay layer device(s) 150. Examples of the overlay layer device(s) 150 include camera 151, thermal imaging camera 152, stud finder 153, ultrasound (US) imager 154, and/or light detection and ranging (LIDAR) camera 155. Additional types of overlay layer data may be stored in a database. For example, the database may be configured to store indications of items disposed on the property, a particular location of the items (e.g., against the north wall of the kitchen), and/or other information that describes the items (e.g., an item type, an item value, image data representative of the item, a repair history, warranty information, indications of damage and/or potential risks posed thereby, and/or other types of data).

As described above, the overlay layer data may be correlated with the underlay layer data (e.g., from the underlay layer device 144) to create the AR display. For example, the camera 151 may be a camera snaking behind a wall that hides a leaking pipe. In this example, the overlay layer data from the camera 151 may be correlated with the underlay layer data to create an AR display such that the user views the wall with an outline of the leaking pipe. The AR base unit 102 may present the outline on the wall as seen via the AR viewer device 103 and/or in a picture-in-picture video feed corresponding to the overlay layer data generated by the camera 151. Additionally, the AR base unit 102 may configured the AR display to include other information describing the leaking pipe.

In some examples, the property inspection indicia detector 126 analyzes the underlay layer data to detect property inspection indicia. Examples of property inspection indicia include a problem with a building (e.g., an issue that a home inspector would record, etc.), or a building code violation. Some more specific examples of property inspection indicia include a leak, water damage, hail damage, mold, damage to insulation, a fire hazard, a structural deficiency, or any other condition that may be included in a property inspection report and/or provide insight into processing an insurance claim.

In some implementations, the property inspection indicia detector 126 detects the property inspection indicia in response to receiving a user generated input. For example, a home inspector using the AR viewer 103 may provide an input indicating a property inspection indicia (e.g., by pressing a button to indicate that the inspector currently detects the property inspection indicia). In this example, the AR base unit 102 may analyze the underlay layer data proximate to the reception of the indication to automatically detect the presence of the property inspection indicia. For example, the AR base unit may route the underlay layer data to the underlay analysis applications 164 to automatically identify the property inspection indicia. Additionally or alternatively, the AR base unit 102 may be configured to automatically route the underlay layer data into the machine learning models disclosed herein without first receiving the user input to automatically generate the property inspection indicia.

In addition, the property inspection indicia detector 126 may generate and store information regarding the detected property inspection indicia for inclusion in an inspection report. The information may include any of the additional information discussed herein (e.g., a description of the property inspection indicia, image data of the property inspection indicia, etc.). In this way, a set of property inspection indicia can be automatically compiled into a list to generate the inspection report.

The AR base unit 102 may also be in communication with property inspection database 118, which may hold any suitable information. Examples of the kinds of information held by the property inspection database 118 include: image data (e.g., image data used to train a machine learning algorithm, image data taken by the taken by the AR viewer device 103 and sent to the property inspection database 118 for storage, etc.), building code data, property data, inspection issues data, insurance data (e.g., insurance profile(s) corresponding to the property 170 or an owner of the property, insurance claim data corresponding to the property 170, etc.), information used to train a machine learning algorithm to identify a property inspection indicia (e.g., data from overlay layer devices 150, and/or the underlay layer device 144), etc.

Additionally or alternatively, in some examples, the property inspection database 118 may be a database of a government, such as a city, local, state, or federal government. In other examples, the property inspection database 118 may be a database of a company, such as a property inspection company, an insurance company, a construction company, a data analysis company, etc. Additional examples of the kinds of information held by the property inspection database 118 include blueprint information of buildings, property inspection information of buildings, etc. Any of the information maintained at the property inspection database 118 may be used as overlay layer data.

Additionally or alternatively, in some examples, the property inspection database 118 may be a database located on an individual property (e.g. property 170). As such the property inspection database 118 may maintain any suitable information regarding the property 170 and/or items disposed thereon. Therefore, additional examples of the kinds of information maintained at the property inspection database 118 include: historical information of the property, previous inspection information of the property, blueprint information of a building on the property, building code compliance information of the building (e.g., certificates indicating passed inspections), construction information of the building (e.g., information of materials used to build the building), information gathered by smart devices 171 (e.g., historical temperature information), ownership information, occupancy information, insurance information, etc. Any of the information maintained at the property inspection database 118 may be used as overlay layer data.

The AR viewer device 103 may be configured to communicate, e.g., via a network 104 (which may be a wired or wireless network, such as the internet), with any other component illustrated in FIG. 1.

The exemplary system 100 may be used as an aide for generating an inspection report for a property, such as the property 170. The property 170 may be any kind of property, such as that including a building, to be inspected. Examples of the property 170 include a home, an apartment building, a commercial building, a warehouse, a factory, etc.

In one example, the property 170 is a smart building, such as a smart home. In some examples, the property 170 includes smart devices 171. Examples of the smart devices include smart thermostats, smart lightbulbs, smart appliances (e.g., smart dishwashers, laundry machines, stoves, refrigerators, etc.), smart sump pumps, etc. In some examples, the property 170 also has a smart home controller 172 (e.g., to control the smart devices 171, or any other devices located on the property 170).

The property 170 may further include Wi-Fi router 174. The Wi-Fi router 174 may provide internet access to any suitable device within a signal range of the Wi-Fi router 174. Furthermore, information broadcast by the Wi-Fi router 174 (e.g., a serving set identifier (SSID), a media access control (MAC) address, etc.) may be used as location data to determine a location on the property 170. For example, the AR viewer device 103 may determine its location by comparing a known position of the Wi-Fi router 174 and a signal strength of a signal therefrom to similar signals from other Wi-Fi routers located proximate to or on the property 170 to identify a more accurate location of the AR viewer device 103 than if only GPS sensors are used to determine location. This may enable the ability to determine the precise room in the property 170 to more accurately identify overlay layer data for display.

In some embodiments, one or more Wi-Fi or Bluetooth beacons 175 may be used to assist in locationing as well. For example, the property 170 may be a commercial building, such as a retail store, which includes beacon(s) 175 to provide push notifications to mobile devices of customers, to generate location data of the mobile data of the customers, etc.

Also connected to the network 104 may be cloud computing device 160 such as a front-end computing device (e.g., a server) that interfaces with a back-end cloud computing environment. In some embodiments, the cloud computing device 160 trains and executes a machine learning algorithm (e.g., to identify a property inspection indicia), as will be described elsewhere herein. The cloud computing device 160 may include one or more processors 161, such as one or more microprocessors, controllers, and/or any other suitable type of processor.

The cloud computing device 160 may further include a memory 162 (e.g., volatile memory, non-volatile memory) accessible by the respective one or more processors 161 (e.g., via a memory controller). The one or more processors 161 may each interact with the memory 162 to obtain, for example, computer-readable instructions stored in the memory 162. Additionally or alternatively, computer-readable instructions may be stored on one or more removable media (e.g., a compact disc, a digital versatile disc, removable flash memory, etc.) that may be coupled to the cloud computing device 160 to provide access to the computer-readable instructions stored thereon. In particular, the computer-readable instructions stored on the memory 122 may include instructions for executing various applications, such as underlay analysis application 164.

Exemplary Machine Learning Techniques

Figure 4:
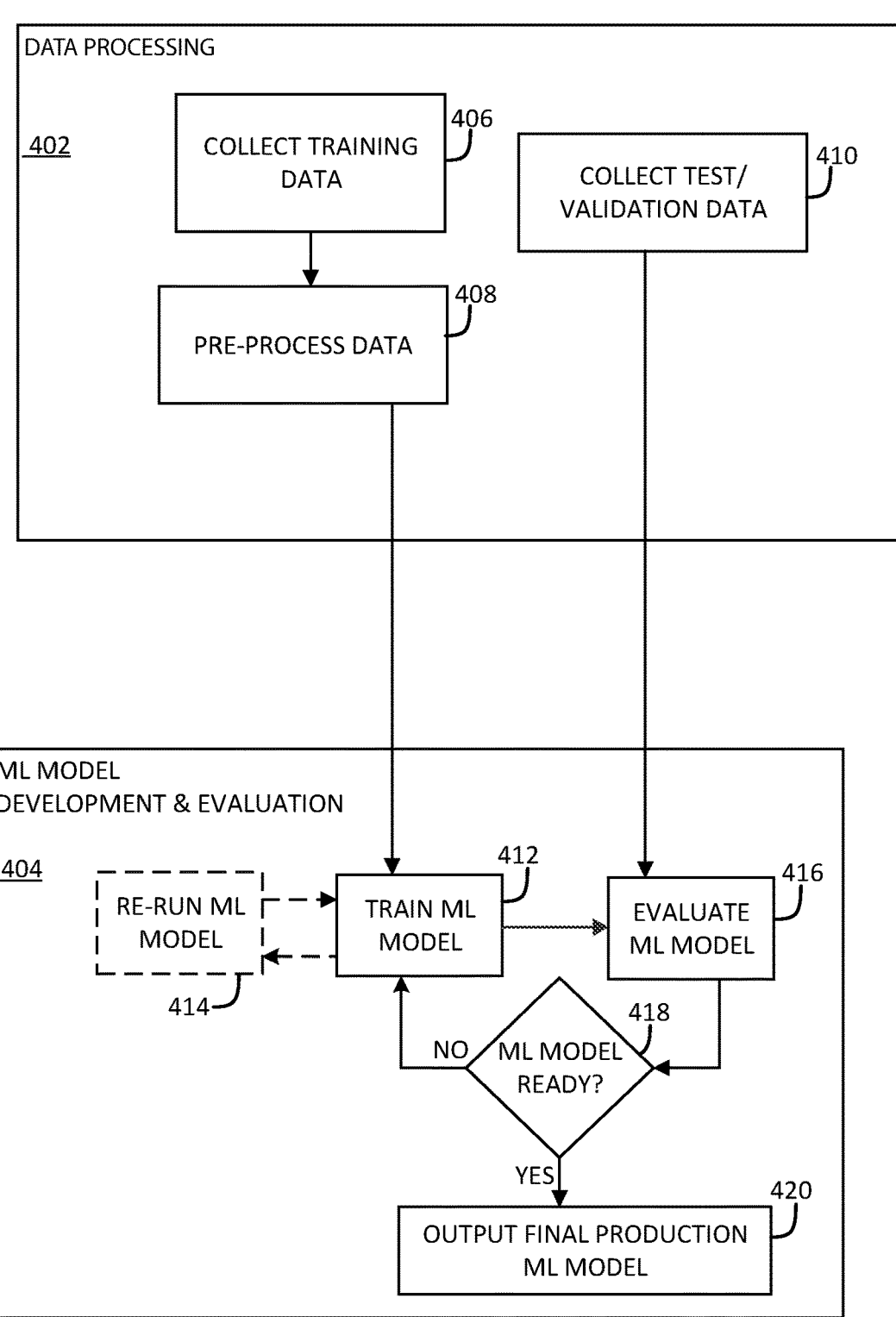
FIG. 4 illustrates an exemplary block diagram of an example machine learning modeling method for training and evaluating a machine algorithm, in accordance with various embodiments.

Broadly speaking, one or both of the underlay analysis applications 128, 164 may train a machine learning algorithm to, for example, identify a property inspection indicia, generate an inspection report, and/or determine other information related to an inspection of a property (e.g., an age of a property inspection indicia, etc.). FIG. 4 is a block diagram of an exemplary machine learning modeling method 400 for training and evaluating a machine learning model (e.g., a machine learning algorithm), in accordance with various embodiments. In some embodiments, the model "learns" an algorithm capable of performing the desired function, such as identifying a property inspection indicia, generating an inspection report, and/or determining other information related to an inspection of a property. It should be understood that the principles of FIG. 4 may apply to any machine learning algorithm discussed herein.

At a high level, the machine learning modeling method 400 includes a block 402 for preparation of model input data, and a block 404 for model training and evaluation. The model training, storage, and implementation may be performed at either of the underlay analysis applications 128, 164, or at any other suitable component.

Depending on implementation, one or more machine learning models may be implemented to train multiple classifiers at the same time. The different trained classifiers may be further operated separately or in conjunction to detect different property inspection indicia. Accordingly, the training data may be associated with any number of tags associated with different property inspection indicia such that a classifier can be trained to detect attributes indicative of the tag. In this sense, the tag may be an indication that the underlying training data includes attributes indicative of the tag and the absence of a tag may be an indication that the underlying training data does not include the attributes indicative of the tag. Training multiple classifiers may provide an advantage of expediting calculations and further increasing specificity of prediction for each classifier's particular instance space.

Depending on implementation, the machine learning model may be trained based upon the tags using supervised learning, unsupervised learning, or semi-supervised learning. Such learning paradigms may include reinforcement learning. Supervised learning is a learning process for learning the underlying function or algorithm that maps an input to an output based on example input-output combinations. A "teaching process" compares predictions by the model to known answers (labeled data) and makes corrections in the model. The trained algorithm is then able to make predictions of outputs for unlabeled input data. In such embodiments, the data (e.g., anonymized historical underlay layer data, and/or anonymized historical overlay layer data) may be labeled according to the corresponding output (e.g., an input from a human labeling a property inspection indicia, etc.).

Unsupervised learning is a learning process for generalizing the underlying structure or distribution in unlabeled data. In embodiments utilizing unsupervised learning, the system may rely on unlabeled underlay layer data and/or overlay layer data. During unsupervised learning, natural structures are identified and exploited for relating instances to each other. Semi-supervised learning can use a mixture of supervised and unsupervised techniques. This learning process discovers and learns the structure in the input variables, where typically some of the input data is labeled, and most is unlabeled. The training operations discussed herein may rely on any one or more of supervised, unsupervised, or semi-supervised learning with regard to the order data and delivery data, depending on the embodiment.

Block 402 may include any one or more blocks or sub-blocks 406-410, which may be implemented multiple times in any suitable order. At block 406, one or both of the underlay analysis applications 128, 164 may obtain training data from the AR viewer device 103, the overlay layer device 150, and/or the property 170.

Initially, at block 408, relevant data may be selected from among available data (e.g., historical data, which may be anonymized). Training data may be assessed and cleaned, including handling missing data and handling outliers. For example, missing records, zero values (e.g., values that were not recorded), incomplete data sets (e.g., for scenarios when data collection was not completed), outliers, and inconclusive data may be removed. In order to select high predictive value features, special feature engineering techniques may be used to derive useful features from the datasets. For example, data may be visualized for the underlying relationships to determine which feature engineering steps should be assessed for performance improvement. This step may include manually entering user input, for example via data entry interface 142, which may include defining possible predictive variables for the machine learning model. Manual user input may also include manually including or excluding variables selection after running special feature engineering techniques. Manual user input may be guided by an interest to evaluate, for example, an interaction of two or more predictor variables (e.g., location of building with water damage and/or wind damage).

Furthermore, at block 408, various measures may be taken to ensure a robust set of training data (e.g., providing standardized, heterogeneous data, removing outliers, imputing missing values, and so on). In certain embodiments, special feature engineering techniques may be used to extract or derive the best representations of the predictor variables to increase the effectiveness of the model. To avoid overfitting, in some embodiments feature reduction may be performed. In some embodiments, feature engineering techniques may include an analysis to remove uncorrelated features or variables. Variables may be evaluated in isolation to eliminate low predictive value variables, for example, by applying a cut-off value.

At block 410, one or both of the underlay analysis applications 128, 164 receives test data for testing the model or validation data for validating the model (e.g., from one of the described respective data sources). Some or all of the training, test, or validation data sets may be labeled with pre-determined answers (e.g., input from an inspector regarding a property inspection indicia, etc.). It should be appreciated that even if the training data and validation data came from the same source, the validation data is kept separate from the training data to avoid biasing the model evaluation.

Furthermore, in some examples, to collect the training data, at block 410 data may be routed from the AR viewer device 103, the overlay layer device 150, and/or the property 170. In such examples, the training data may be collected along with user input to provide positive or negative reinforcement training of the machine learning algorithm.

Block 404 illustrates an exemplary machine learning (ML) model development and evaluation phase. Block 404 may include any one or more blocks or sub-blocks 412-420, which may be implemented in any suitable order. In one example, at block 412, the training module trains the machine learning model by running one or more pre-processed training data sets described above. At block 414, the training module re-runs several iterations of the machine learning model. At block 416, the training module evaluates the machine learning model, at block 418 the training module determines whether or not the machine learning model is ready for deployment before either proceeding to block 420 to output final production model or returning to block 412 to further develop, test, or validate the model.

Regarding block 412, developing the model typically involves training the model using training data. At a high level, the machine learning model may be utilized to discover relationships between various observable features (e.g., between predictor features and target features) in a training dataset, which can then be applied to an input dataset to predict unknown values for one or more of these features given the known values for the remaining features. At block 404, these relationships are discovered by feeding the model pre-processed training data including instances each having one or more predictor feature values and one or more target feature values. The model then "learns" an algorithm capable of calculating or predicting the target feature values (e.g., to identify property inspection indicia, or to create a property inspection report) given the predictor feature values.

At block 412, the machine learning model may be trained (e.g., by one or both of the underlay analysis applications 128, 164) to thereby generate the classifiers. Techniques for training/generating the classifiers that apply tags to the input data may include gradient boosting, neural networks, deep learning, linear regression, polynomial regression, logistic regression, support vector machines, decision trees, random forests, nearest neighbors, or any other suitable machine learning technique. In some examples, one or both of the underlay analysis applications 128, 164 implements gradient boosting machine learning (for example, using the open source extreme gradient boosting (XGBoost) algorithm) with a secondary application of the model for close cases and/or error correction. In certain embodiments, training the machine learning model may include training more than one classifier according to the selected method(s) on the data pre-processed at block 408 implementing different method (s) and/or using different sub-sets of the training data, or according to other criteria.

Additionally, the machine learning model may include multiple layers. For example, in a first layer, the machine learning model may be configured to segment the input underlay layer data to identify and/or label objects. For example, the first layer may identify that the underlay layer data includes image data representative of an appliance, smart device, wall, pipe, or any other object associated with property inspection indicia. Accordingly, in addition to applying a tag that indicates the detected object type, the classifiers in the first layer may identify a segment of the input underlay layer data that includes the image data representative of the object. In this example, the second layer may then be configured to analyze the segmented image data to identify the particular conditions of the object associated with property inspection indicia (e.g., damage to the object, a dimension of the object, or any other condition associated with a property inspection indicia). Accordingly, the machine learning model may include different classifiers in the second layer that are applied in response to different tags applied by the first layer.

In some further embodiments, the machine learning model may include a third layer configured to estimate an age of damage to an object (e.g., an object that was identified by a classifier in the first layer, and identified as having damage by a classifier in the second layer). Accordingly, a classifier in the third layer may be trained to identify signs of aging (e.g., discoloration, formation of cracks, presence of rust or mold, etc.) to estimate an age of the damage. In some embodiments, the models in the third layer also include historical weather data to account for rain or other precipitation at the location of the property. Accordingly, machine learning models that include this third layer may be able to determine, for example, whether the damage occurred before or after a time associated with a claim for the damage.

It should be appreciated that the particular classifiers and models that are implemented in the hierarchical model are not necessarily trained at the same time and/or based on the same training data sets. For example, some of the particular classifiers may be useful for other tasks performed by the operator of the disclosed systems (e.g., an object classifier that builds automated inventory lists). As such, some of the component classifiers may be integrated into multiple machine learning models. Accordingly, the individual classifiers, segmenters, parsers, etc. that form the overall machine learning hierarchy may be modularly trained. Additionally, the ability to identify new objects and/or detect additional indicia for objects may be added by including an additional classifier to the machine learning hierarchy described herein.

Training the machine learning model and/or components thereof may include re-running the model (at optional block 414) to improve the accuracy of prediction values. For example, re-running the model may improve model training when implementing gradient boosting machine learning. In another implementation, re-running the model may be necessary to assess the differences caused by an evaluation procedure. For instance, available data sets in the AR viewer device 103, the overlay layer device 150, the property inspection database 118, and/or the property 170 may be split into training and testing data sets by randomly assigning sub-sets of data to be used to train the model or evaluate the model to meet the predefined train or test set size, or an evaluation procedure may use a k-fold cross validation. Both of these evaluation procedures are stochastic, and, as such, each evaluation of a deterministic machine learning model, even when running the same algorithm, provides a different estimate of error or accuracy. The performance of these different model runs may be compared using one or more accuracy metrics, for example, as a distribution with mean expected error or accuracy and a standard deviation. In certain implementations, the models may be evaluated using metrics such as root mean square error (RMSE), to measure the accuracy of prediction values.

Regarding block 416, evaluating the model typically involves testing the model using testing data or validating the model using validation data. Testing/validation data typically includes both predictor feature values and target feature values (e.g., including order demand patterns for which corresponding delivery patterns are known), enabling comparison of target feature values predicted by the model to the actual target feature values, enabling one to evaluate the performance of the model. This testing/validation process is valuable because the model, when implemented, will generate target feature values for future input data that may not be easily checked or validated.

Thus, it is advantageous to check one or more accuracy metrics of the model on data for which the target answer is already known (e.g., testing data or validation data, such as data including historical overlay layer data and historical property inspection indicia data), and use this assessment as a proxy for predictive accuracy on future data. Exemplary accuracy metrics include key performance indicators, comparisons between historical trends and predictions of results, cross-validation with subject matter experts, comparisons between predicted results and actual results, etc.

Regarding block 418, one or both of the underlay analysis applications 128, 164 may utilize any suitable set of metrics to determine whether or not to proceed to block 420 to output the final production model. Generally speaking, the decision to proceed to block 420 or to return to block 412 will depend on one or more accuracy metrics generated during evaluation (block 416). After the sub-blocks 412-418 of block 404 have been completed, block 420 may be implemented. At block 420, the machine learning model is output.

Exemplary Displays

Figure 2A:
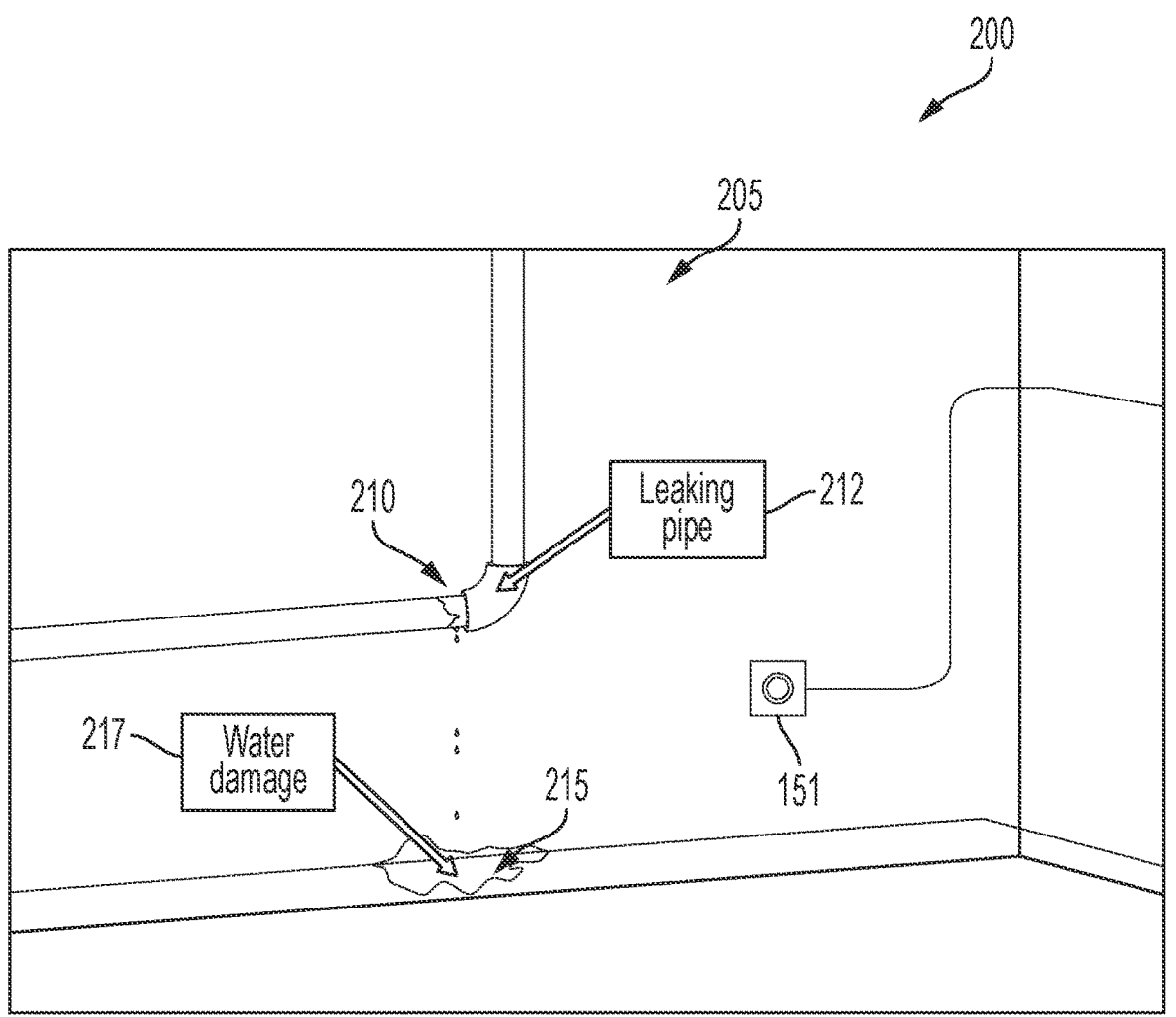
FIG. 2A illustrates an exemplary AR display, including a leaking pipe and water damage.

In some examples, the AR display creator 124 may create an AR display, such as the example AR display 200 of FIG. 2A. In the example AR display 200, a wall 205 with a leaking pipe 210 behind the wall 205 causing water damage 215 is presented. The AR display 200 may optionally include text 212 indicating "leaking pipe," and/or text 217 indicating "water damage" (e.g. indicating the property inspection indicia). However, it should be understood that these features are optional, and the AR display 200 may be created without including an indication of a property inspection indicia.

The AR display 200 may optionally further show camera 151 snaking behind the wall 205. Data from the camera 151 (or other overlay layer device 150) may be used as part of the creation of the AR display 200. However, regardless of whether or not data from the camera 151 is used to create the display 200, the inclusion of the representation of the camera 151 itself in the AR display 200 is optional (e.g., can be set by a user of the AR viewer device 103).

Additionally or alternatively to capturing overlay layer data (e.g., from the camera 151 as in the preceding example)

in real time, pre-generated overlay layer data (e.g., data generated by the overlay layer device during a time period before the underlay layer device generates data, blueprint data, etc.) may be used to create the AR display 200. For example, an object may be detected in the underlay layer data to correlate corresponding overlay layer data with the underlay layer data. In one example, the object may be the wall 205. In some embodiments, the position and orientation of the underlay layer device (e.g., determined by the position sensor 147 and the orientation sensor 146) may be used to help identify which objects are in the FOV of the AR viewer (in the illustrated scenario, that is the camera 151, the pipe 210, the wall 205) to identify the particular overlay layer data to correlate with the underlay layer data.

Figure 2B:
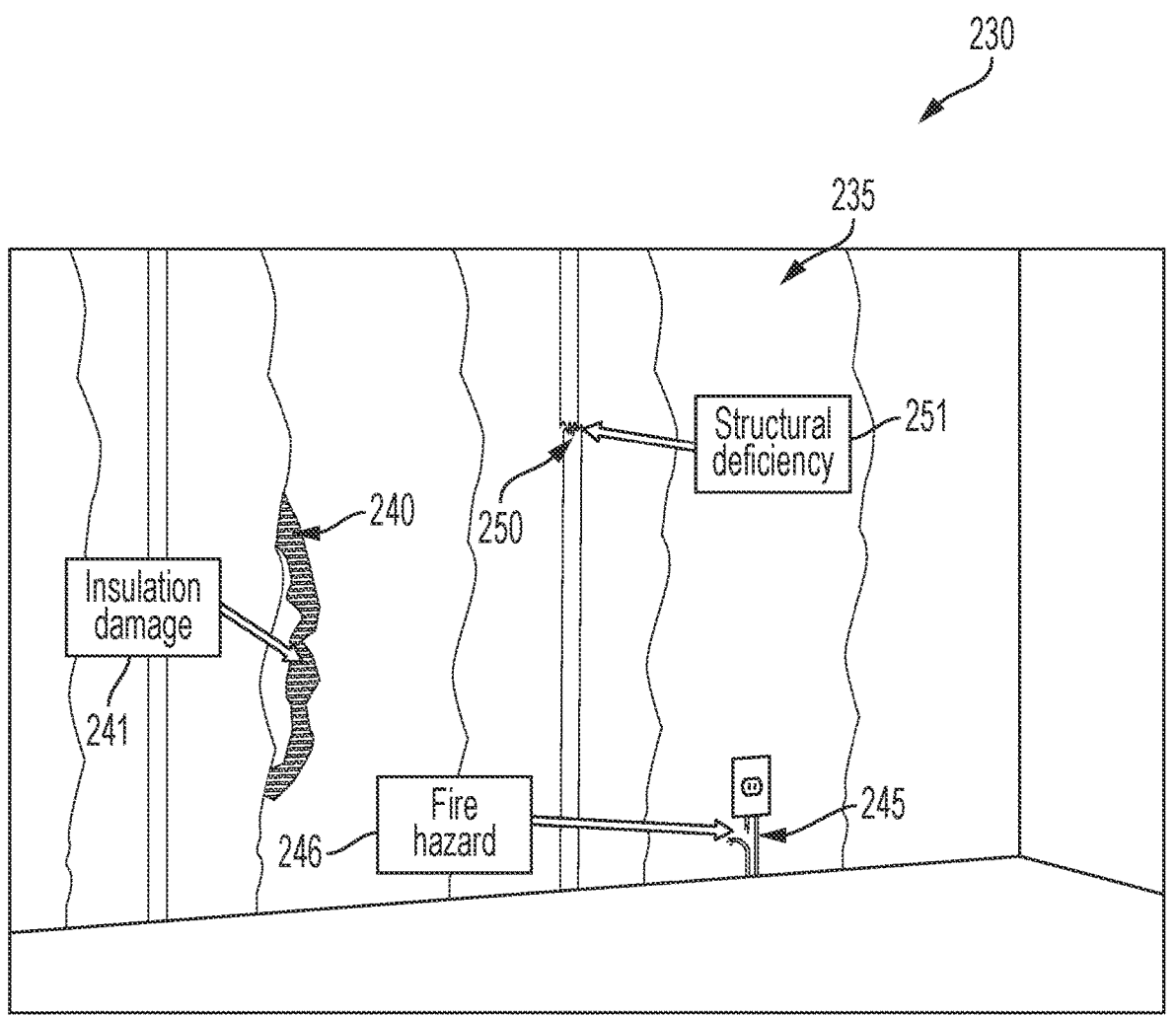
FIG. 2B illustrates an exemplary AR display, including insulation damage, a fire hazard, and a structural deficiency.

FIG. 2B illustrates another example AR display, which may be created by the AR display creator 124. The example AR display 230 of FIG. 2B illustrates, behind the wall 235: insulation damage 240, fire hazard 245, and structural deficiency 250. The AR display 230 may also include text boxes indicating the property indicia. For example, the AR display 230 may include: text box 241 indicating "insulation damage," text box 246 indicating "fire hazard," and/or text box 251 indicting "structural deficiency." Furthermore, to create the AR display 230, the AR display creator 124 may use underlay layer data generated by the underlay layer device 144, and overlay layer devices 150. In some examples, an overlay layer device 150 may be the thermal imaging camera 152, which generates thermal data showing the insulation damage 240. In another example, an overlay layer device 150 may be the stud finder 153, which generates data showing the structural deficiency 250, or the fire hazard 246 (e.g., the stud finder 153 is configured to also find electrical wires, and finds a broken electrical wire).

In some examples, the one or more processors 120 also determine an age of the property inspection indicia. For example, an image of the property inspection indicia (e.g., the structural deficiency 250, the insulation damage 240, roof hail damage, etc.) may be input into a machine learning algorithm which includes a model configured to output an estimated age of the property inspection indicia.

FIG. 2C illustrates another exemplary AR display, which may be created by the AR display creator 124. The exemplary AR display 260 shows a bathroom including a shower 265. As illustrated by textbox 270, the exemplary shower 265 has a floor 275 with a slope of XYZ in. per. ft., which is in compliance with city guidelines. As this shows, in some embodiments, the AR display may indicate that property features are in compliance with governmental guidelines. Furthermore, to create the AR display 260, the AR display creator 124 may use underlay layer data generated by the underlay layer device 144, and overlay layer device 150. In some examples, the overlay layer device 150 may be the LIDAR camera 155, which is capable of providing data that enables the accurate determination of a slope of the floor 275.

Exemplary Inspection Report

Figure 3:
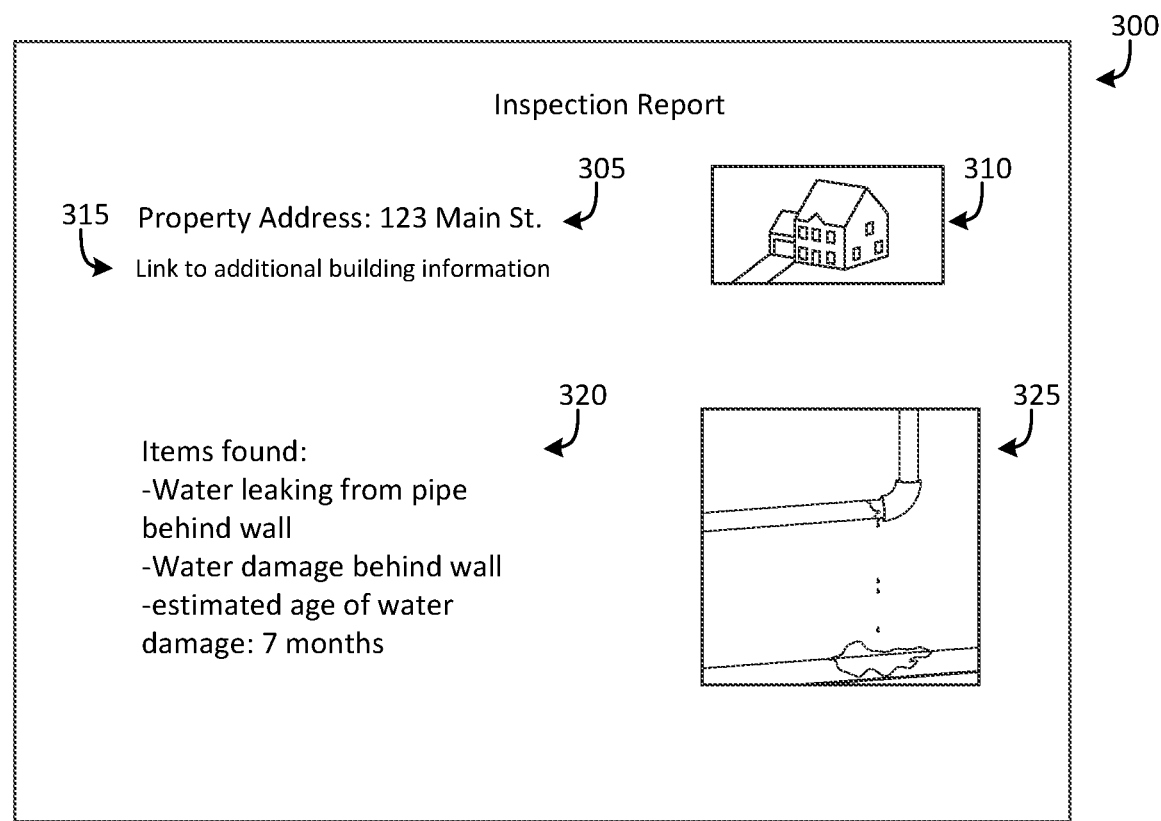
FIG. 3 illustrates an exemplary inspection report.

The report generator 130 is configured to wholly or partially generate inspection reports, such as the exemplary inspection report 300 of FIG. 3. The report 300 may include a property address 305, a picture of the property 310 (e.g., a picture of a front of the property), a link to additional property information 315, a list of property inspection indicia 320, and/or images(s) from the AR display 325. The additional property information linked to by the link 315 may include any information of the property, such as specifications of the property (e.g., square footage, etc.), specifications of a building on the property (e.g., square footage, number of bathrooms, number of stories, year built, etc.), historical information of the property, previous inspection information of the property, blueprint information of the building on the property, building code compliance information of the building on the property (e.g., certificates indicating passed inspections), construction information of the building on the property (e.g., information of materials used to build the building), information gathered by smart devices of the building on the property (e.g., historical temperature information), ownership information, occupancy information, insurance information, etc.

The list of property inspection indicia 320 may include any combination of property inspection indicia detected automatically (e.g., by being identified by a machine learning algorithm), and/or from user input (e.g., a house inspector indicates an input while viewing the AR display). As described above, in response to detecting a property inspection indicia, the AR base unit 102 may be configured to compile a plurality of information regarding the property inspection indicia into an indicia objects maintained at property inspection database 118. Accordingly, in response to a user indicating that the report 300 is to be generated, the report generator 130 may be configured to automatically compile the indicia objects into the report 300. The report generator 130 may then provide a user interface that enables a user to approve, modify, and/or reject any of the indicia objects included in the report 300 to ensure that the automated techniques described herein accurately reflect the property inspection indicia of the property 170.

The inspection report 300 may also be used as a claims adjuster report (e.g., a report that is sent to an insurance claims adjuster). Advantageously, a claims adjuster may use the information in the inspection report 300 to verify information in an insurance claim. In one example, the inspection report 300 may contain an age of roof damage from hail, which may be used to verify the validity of an insurance claim for the roof damage.

Exemplary Methods of AR Property Inspection

FIG. 5 shows an exemplary implementation 500 of a computer-implemented method of using AR for inspection of a property. The exemplary implementation begins at block 505 where underlay layer data is received (e.g., by the AR base unit 102 from the AR viewer device 103). In one example, as discussed above, the underlay layer data is generated by an underlay layer device 144 (e.g., a camera, etc.) coupled to the AR viewer device 103. In this regard, the underlay layer data may indicate a field of view associated with the AR viewer device 103.

At block 510 overlay layer data may be received. For example, the overlay layer data may be sent from any of the overlay layer devices 150, property inspection database 118, and/or property 170 to the AR base unit 102. In one illustrative example, FIG. 2A shows the overlay layer data generated by camera 151 snaking behind the wall 205. In this regard, the exemplary AR display 200 of FIG. 2A shows underlay layer data with a field of view including a first side of a wall 205 (e.g., an exterior side of the wall 205), and overlay layer data with a field of view including a second side of the wall 205 that is opposite the first side of the wall 205 (e.g., an interior side of the wall 205 with the leaking pipe 210).

At block 515, the overlay layer data may be correlated with the underlay layer data. The overlay layer data, and the underlay layer data may be correlated by any suitable technique. In one example, an object is identified in the field of view associated with the AR device 103. Then, overlay layer data may be obtained corresponding to the identified object. For instance, a corner of a wall (e.g., the object) may be identified in the underlay layer data, and then blueprint and/or layout data (e.g., from property inspection database 118) may be obtained.

In another example, a location of the property may first be determined. The location may be determined by any suitable technique. For instance, the location of the property may be determined by GPS data from the AR viewer device 103. Additionally or alternatively, the location of the property may be determined from the Wi-Fi router 174, and/or the beacon 175. In some embodiments, the location of the property may be generated through a triangulation technique based upon information from multiple Wi-Fi router(s) 174 and/or beacon(s) 175.

Additionally or alternatively, orientation data from the orientation sensor 146 may be used as part of the identification of the location of the property. For example, location data may first be received from the Wi-Fi router(s) 174 and/or beacon(s) 175; and then the location data along with the orientation data may be superimposed onto (or compared to) a layout (e.g., blueprint data) of the property to identify the location at the property. Subsequent to the determination/identification of the location of the property, an object known to be located at the property (e.g., from information from the property inspection database 118) may be used to correlate the overlay layer data and the underlay layer data. For instance, the underlay layer data and/or the overlay layer data may be analyzed to detect the presence of the object.

At block 520, a property inspection indicia may be identified based upon the correlated overlay layer data. Examples of the property inspection indicia include a water leakage, a water damage, an insulation deficiency, a fire hazard, a structural deficiency, and building code compliance information. In one example, the property inspection indicia includes a leaking pipe (e.g., a water leakage), which may be identified by inputting underlay layer data from camera 151 into a trained machine learning algorithm. In another example, the identification may be done by a human (e.g., an inspector); for instance, a human sees a leaking pipe displayed on the display device 140, and types input into the data entry interface 142 indicating the leaking pipe. In yet another example, a human flags (e.g., enters input indicating) that an image displayed on the display device 140 depicts a property inspection indicia, and then the flagged image is analyzed by the machine learning algorithm to determine the property inspection indicia.

At block 525, an AR display may be created based upon the correlation. The created AR display may include an indication of the property inspection indicia. For example, the indication may include text (e.g., in a bordered or unbordered text box) describing the property inspection indicia (e.g., "leaking water pipe," "fire hazard," "potential building code violation," etc.). In another example, the indication may label an object associated with the property inspection indicia (e.g., text stating "water pipe," "insulation," etc.).

Additionally or alternatively, the indication may be color coded. For example, if there is a high degree of certainly that the property inspection indicia is a problem (e.g., a high degree of certainty that insulation is damaged), the indication may be made in red; with a medium degree of certainty that the property inspection indicia is a problem (e.g., a medium degree of certainty that insulation is damaged), the indication may be made in yellow; and with a low degree of certainty that the property inspection indicia is a problem (e.g., a low degree of certainty that insulation is damaged), the indication may be made in green.

Additionally or alternatively, the indication may include an age of the property inspection indicia, for example, as determined by a machine learning model. Additionally or alternatively, the indication may include a warning associated with a building code violation. For example, the warning may indicate that the slope of a shower floor is not in compliance with a government regulation. In another example, the warning may indicate that a grade of the insulation is not in compliance with a government regulation. In yet another example, the warning may indicate that a water pipe is the wrong diameter size; an escape ladder is not present where it should be; and/or that there is insufficient ventilation in a room.

At block 530, the AR display may be displayed on the display device 140.

At block 535, an image and/or video from the AR display associated with the property inspection indicia may be stored (e.g., in the memory 122, the property inspection database 118, etc.). In some embodiments, the storing of the image is triggered by the identification of a new property inspection indicia.

At block 540, a report may be generated (e.g., a property inspection report, such as that as in the example report 300 of FIG. 3). The report may include the image and/or video stored at block 535. The report may further include a description of the property inspection indicia. For example, the description may label the property inspection indicia (e.g., leaking water pipe, water damage, fire hazard, insufficient insulation, etc.). In additional examples, the description may also include: an estimated age of the property inspection indicia; a location of the property inspection indicia (e.g., a room location, such as a master bedroom, a kitchen, a garage, bathroom, etc.); and/or an estimated cost to repair the property inspection indicia.

At block 545, the underlay layer data and/or the overlay layer data may be routed to a machine learning algorithm to thereby train or further train the machine learning algorithm (e.g., in an unsupervised, semi-supervised, or supervised learning process). As discussed elsewhere herein, the machine learning algorithm may be trained to identify a property inspection indicia, generate an inspection report, and/or determine other information related to an inspection of a property (e.g., an age of a property inspection indicia). As discussed elsewhere herein, the underlay layer data may be data generated by the underlay layer device 144; and the overlay layer data may be the data generated by any of the overlay layer devices 150.

At block 550, a user input may be detected indicating whether an output of the machine leaning algorithm is correct. Examples of the output of the machine learning algorithm include property inspection indicia, components of the report (e.g., descriptions of the property inspection indicia, etc.), etc. Accordingly, a user reviewing an automatically generated inspection report, such as the report 300 of FIG. 3, may provide the indications of whether or not the machine learning algorithm properly identified the property inspection indicia as part of approving the final report.

At block 555, the user input may be routed to the machine learning algorithm, which may to use the user inputs for positive and/or negative reinforcement training of the machine learning algorithm. In some embodiments, a portion of the underlay layer data and/or the overlay layer data is included with the indication of positive or negative feedback.

It should be understood that not all blocks of the example flowcharts 400, 500 are required to be performed. Moreover, the example flowcharts 400, 500 are not mutually exclusive (e.g., block(s) from each example flowchart 400, 500 may be performed in any particular implementation).

Applicability to the Insurance Industry

Some embodiments have particular applicability to the insurance industry. For example, an insurance quote for the property (e.g., the property 170) may be generated based upon property inspection indicia identified by the techniques described herein. The generated report (e.g., as in the example report 300 of FIG. 3) may also be used as part of generating an insurance quote for the property.

In another example, the generated report may allow an insurance customer to opt-in to a rewards, insurance discount, or other type of program. After the insurance customer provides their affirmative consent, an insurance provider remote server may collect data from the customer's mobile device, smart home controller, or other smart devices (e.g., smart devices 171)—such as with the customer's permission or affirmative consent. The data collected may be related to smart home functionality (or home occupant preferences or preference profiles), and/or insured assets before (and/or after) an insurance-related event, including those events discussed elsewhere herein. In return, risk averse insureds, home owners, or home or apartment occupants may receive discounts or insurance cost savings related to home, renters, personal articles, auto, and other types of insurance from the insurance provider.

In one aspect, smart or interconnected home data, and/or other data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

Exemplary Use of AR for Inspection of a Property

In one aspect, a computer-implemented method of using Augmented Reality (AR) for inspection of a property may be provided. The method may include: (1) receiving, with one or more processors, underlay layer data indicative of a field of view associated with an AR viewer device; (2) receiving, with the one or more processors, overlay layer data; (3) correlating, with the one or more processors, the overlay layer data with the underlay layer data; (4) identifying, with the one or more processors, a property inspection indicia based upon the correlated overlay layer data; (5) creating, with the one or more processors, an AR display based upon the correlation, the AR display including an indication of the property inspection indicia; and/or (6) displaying, with the one or more processors, the AR display to a user via the AR viewer device. The method may include additional, fewer, or alternate actions, including those discussed elsewhere herein.

In some embodiments, the property inspection indicia includes: a water leakage; a water damage; an insulation deficiency; a fire hazard; a structural deficiency; and/or building code compliance information. In some embodiments, the overlay layer data comprises data generated from: a camera; a thermal imaging camera; a stud finder device; an ultrasound (US) imager; and/or an analysis of a blueprint of a building on the property. In certain embodiments, the underlay layer data is generated by a camera coupled to the AR viewer device.

In some embodiments, the method further includes: in response to identifying the property inspection indicia, with the one or more processors, storing an image of the AR display; and generating, with the one or more processors, a report that correlates: (i) the stored image, and (ii) a description of the property inspection indicia.

In some embodiments, generating the report further includes: correlating, with the one or more processors, the stored image to a location on the property; and including, with the one or more processors, the correlated location in the report. In certain embodiments, the property inspection indicia may be generated in response to a user input.

In some embodiments, identifying the property inspection indicia includes: routing, with the one or more processors, the underlay layer data and/or the overlay layer data to a machine learning algorithm.

The method may further include: detecting, with the one or more processors, a user input indicating whether an output of the machine leaning algorithm is correct; and training the machine learning algorithm by routing, via the one or more processors, an indication of the user input to the machine learning algorithm. The user input and the output of the machine learning algorithm may be used as inputs for positive or negative reinforcement training of the machine learning algorithm.

In some embodiments, routing the indication of the user input to the machine learning algorithm further includes: routing, via the one or more processors, to the machine learning algorithm, overlay layer data corresponding the user input, wherein the overlay layer data corresponding the user input includes: (i) image data of home inspection indicia, (ii) thermal image data of home inspection indicia, and/or (iii) stud finder data of home inspection indicia.

In some embodiments, the machine learning algorithm is further configured to produce an estimate of an age the property inspection indicia. Receiving the underlay layer data may include receiving, with the one or more processors, the underlay layer data from a first camera with a field of view including a first side of a wall; and receiving the overlay layer data may include receiving, with the one or more processors, the overlay layer data from a second camera with a field of view including a second side of a wall opposite the first side of the wall.

In some embodiments, correlating the overlay layer data with the underlay layer data may include: identifying a location of a property based upon the field of view associated with the AR viewer device; identifying overlay layer data associated with an object located at the identified location of the property; and/or analyzing the underlay layer data to detect a presence of the object.

In some embodiments, creating the AR display may include a text box with text describing the object and/or a warning that the object is associated with a building code violation.

In some embodiments, identifying the location of the property viewable via the AR viewer device may include: generating, with the one or more processors, location data of the AR viewer device based upon information received from a Wi-Fi router and/or a beacon device; receiving, with the one or more processors, orientation data of the AR viewer device from an orientation sensor of the AR viewer device; and comparing the location data and the orientation data to a layout of the property.

In some embodiments, correlating the overlay layer data with the underlay layer data may include: based upon the underlay image data, identifying an object located within the field of view associated with the AR viewer device; and/or obtaining overlay layer data corresponding to the identified object.

In some embodiments, creating the AR display may include creating a text box with text describing the identified object, and/or a warning that the identified object is associated with a building code violation.

In another aspect, a computer system configured to use augmented reality (AR) for inspection of a property may be provided. The computer system may comprise one or more processors configured to: (1) receive underlay layer data indicative of a field of view associated with an AR viewer device; (2) receive overlay layer data; (3) correlate the overlay layer data with the underlay layer data; (4) identify, with the one or more processors, a property inspection indicia based upon the correlated overlay layer data; (5) create an AR display based upon the correlation, the AR display including an indication of the property inspection indicia; and/or (6) display the AR display to a user via the AR viewer device. The computer system may include additional, less, or alternate functionality, including that discussed elsewhere herein.

In some embodiments, the property inspection indicia includes: a water leakage; a water damage; an insulation deficiency; a fire hazard; a structural deficiency; and/or building code compliance information. In some embodiments, the overlay layer data may include data generated from: a camera; a thermal imaging camera; a stud finder device; an ultrasound (US) imager; and/or an analysis of a blueprint of a building on the property.

In some embodiments, the system further comprises: (i) the AR viewer device, and (ii) a camera, wherein the underlay layer data comprises data generated by the camera.

In some embodiments, the one or more processors are configured to generate the property inspection indicia by routing the underlay layer data and/or the overlay layer data into a machine learning algorithm.

In yet another aspect, a computer device for using Augmented Reality (AR) for inspection of a property may be provided. The computer device may include: one or more processors; and one or more memories coupled to the one or more processors. The one or more memories including computer executable instructions stored therein that, when executed by the one or more processors, may cause the one or more processors to: (1) receive underlay layer data indicative of a field of view associated with an AR viewer device; (2) receive overlay layer data; (3) correlate the overlay layer data with the underlay layer data; (4) identify, with the one or more processors, a property inspection indicia based upon the correlated overlay layer data; (5) create an AR display based upon the correlation, the AR display including an indication of the property inspection indicia; and/or (6) display the AR display to a user via the AR viewer device. The computer device may include additional, less, or alternate functionality, including that discussed elsewhere herein.

In some embodiments, the one or more memories including computer executable instructions stored therein that, when executed by the one or more processors, further cause the one or more processors to generate the property inspection indicia by routing the underlay layer data and/or the overlay layer data into a machine learning algorithm.

ADDITIONAL CONSIDERATIONS

As used herein, the term "indicia" means both singular and plural. For example, the phrase "property inspection indicia" may mean either of a single property inspection indicium (e.g., a single leaking pipe) or multiple property inspection indicia (e.g., multiple leaking pipes, or a single leaking pipe and a building code violation, etc.).

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term ' ' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

Furthermore, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A computer-implemented method of using Augmented Reality (AR) for inspection of a property, the method comprising:
generating, in real time, overlay layer data by snaking a camera behind a wall;
receiving, with one or more processors, underlay layer data indicative of a field of view associated with an AR viewer device;
receiving, with the one or more processors, the overlay layer data;
correlating, with the one or more processors, the overlay layer data with the underlay layer data;
identifying, with the one or more processors, a property inspection indicia based upon the correlated overlay layer data generated by snaking the camera behind the wall;
creating, with the one or more processors, an AR display based upon the correlation, the AR display including (i) an indication of the property inspection indicia, and (ii) the camera snaking behind the wall; and
displaying, with the one or more processors, the AR display to a user via the AR viewer device.

2. The computer-implemented method of claim 1, wherein the property inspection indicia comprises:
a water leakage;
a water damage;
an insulation deficiency;
a fire hazard;
a structural deficiency; and/or
building code compliance information.

3. The computer-implemented method of claim 1, wherein the overlay layer data further comprises data generated from:
a thermal imaging camera;
a stud finder device;
an ultrasound (US) imager; and/or
an analysis of a blueprint of a building on the property.

4. The computer-implemented method of claim 1, wherein:
the underlay layer data is generated by an underlay layer camera coupled to the AR viewer device.

5. The computer-implemented method of claim 1, further comprising:

in response to identifying the property inspection indicia, with the one or more processors, storing an image of the AR display; and generating, with the one or more processors, a report that correlates: (i) the stored image, and (ii) a description of the property inspection indicia.

6. The computer-implemented method of claim 5, wherein generating the report further comprises:

correlating, with the one or more processors, the stored image to a location on the property; and including, with the one or more processors, the correlated location in the report.

7. The computer-implemented method of claim 1, wherein the property inspection indicia is generated in response to a user input.

8. The computer-implemented method of claim 1, wherein identifying the property inspection indicia comprises:

routing, with the one or more processors, the underlay layer data and/or the overlay layer data to a machine learning algorithm.

9. The computer-implemented method of claim 8, further comprising:

detecting, with the one or more processors, a user input indicating whether an output of the machine learning algorithm is correct; and training the machine learning algorithm by routing, via the one or more processors, an indication of the user input to the machine learning algorithm, wherein the user input and the output of the machine learning algorithm are used as inputs for positive or negative reinforcement training of the machine learning algorithm.

10. The computer-implemented method of claim 9, wherein routing the indication of the user input to the machine learning algorithm further comprises:

routing, via the one or more processors, to the machine learning algorithm, overlay layer data corresponding the user input, wherein the overlay layer data corresponding the user input includes: (i) image data of home inspection indicia, (ii) thermal image data of home inspection indicia, and/or (iii) stud finder data of home inspection indicia.

11. The computer-implemented method of claim 9, wherein the machine learning algorithm is further configured to produce an estimate of an age the property inspection indicia.

12. The computer-implemented method of claim 1, wherein:

receiving the underlay layer data comprises receiving, with the one or more processors, the underlay layer data from a first camera with a field of view including a front side of the wall.

13. The computer-implemented method of claim 1, wherein correlating the overlay layer data with the underlay layer data comprises:

identifying a location of a property based upon the field of view associated with the AR viewer device;

identifying overlay layer data associated with an object located at the identified location of the property; and analyzing the underlay layer data to detect a presence of the object.

14. The computer-implemented method of claim 13, wherein creating the AR display further comprises including a text box with text describing the object.

15. The computer-implemented method of claim 13, wherein creating the AR display further comprises including a warning that the object is associated with a building code violation.

16. The computer-implemented method of claim 13, wherein identifying the location of the property viewable via the AR viewer device further comprises:

generating, with the one or more processors, location data of the AR viewer device based upon information received from a Wi-Fi router and/or a beacon device;

receiving, with the one or more processors, orientation data of the AR viewer device from an orientation sensor of the AR viewer device; and comparing the location data and the orientation data to a layout of the property.

17. The computer-implemented method of claim 1, wherein correlating the overlay layer data with the underlay layer data comprises:

based upon the underlay data, identifying an object located within the field of view associated with the AR viewer device; and obtaining overlay layer data corresponding to the identified object.

18. The computer-implemented method of claim 17, wherein creating the AR display further comprises including a text box with text describing the identified object.

19. The computer-implemented method of claim 17, wherein creating the AR display further comprises including a warning that the identified object is associated with a building code violation.

20. A computer system configured to use Augmented Reality (AR) for inspection of a property, the computer system comprising one or more processors configured to:

receive underlay layer data indicative of a field of view associated with an AR viewer device;

receive overlay layer data generated by a camera snaking behind a wall;

correlate the overlay layer data with the underlay layer data;

identify a property inspection indicia based upon the correlated overlay layer data generated by snaking the camera behind the wall;

create an AR display based upon the correlation, the AR display including (i) an indication of the property inspection indicia, and (ii) the camera snaking behind the wall; and display the AR display to a user via the AR viewer device.

21. The computer system of claim 20, wherein the property inspection indicia comprises:

a water leakage;

a water damage;

an insulation deficiency;

a fire hazard;

a structural deficiency; and/or building code compliance information.

22. The computer system of claim 20, wherein the overlay layer data further comprises data generated from:

a thermal imaging camera;

a stud finder device;

an ultrasound (US) imager; and/or an analysis of a blueprint of a building on the property.

23. The computer system of claim 20, further comprising: (i) the AR viewer device, and (ii) an underlay layer camera, wherein the underlay layer data comprises data generated by the underlay layer camera.

24. The computer system of claim 20, wherein the one or more processors are configured to generate the property inspection indicia by routing the underlay layer data and/or the overlay layer data into a machine learning algorithm.

25. A computer device for using Augmented Reality (AR) for inspection of a property, the computer device comprising:

one or more processors; and one or more memories coupled to the one or more processors;

the one or more memories including computer-executable instructions stored therein that, when executed by the one or more processors, cause the one or more processors to:

receive underlay layer data indicative of a field of view associated with an AR viewer device;

receive overlay layer data generated by a camera snaking behind a wall;

correlate the overlay layer data with the underlay layer data;

identify a property inspection indicia based upon the correlated overlay layer data generated by snaking the camera behind the wall;

create an AR display based upon the correlation, the AR display including (i) an indication of the property inspection indicia, and (ii) the camera snaking behind the wall; and display the AR display to a user via the AR viewer device.

26. The computer device of claim 25, wherein the one or more memories including computer-executable instructions stored therein that, when executed by the one or more processors, further cause the one or more processors to generate the property inspection indicia by routing the underlay layer data and/or the overlay layer data into a machine learning algorithm.

\* \* \* \* \*